March 5, 1957  A. J. DANEK  2,784,348
SIGNAL LIGHT SYSTEM FOR MOTOR VEHICLES
Filed June 6, 1952  3 Sheets-Sheet 1
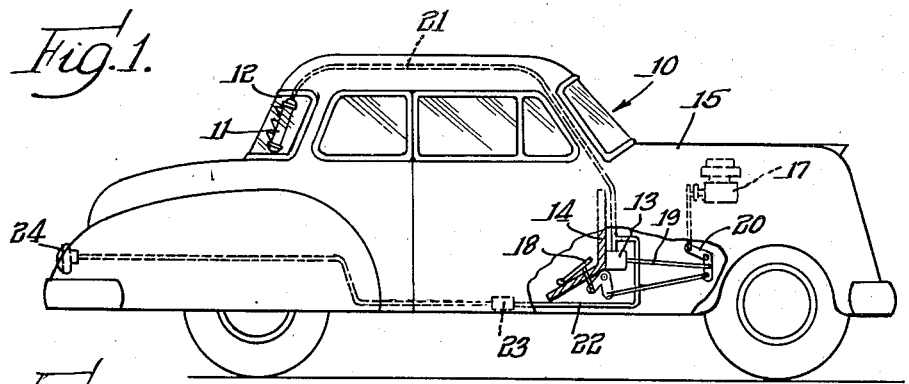
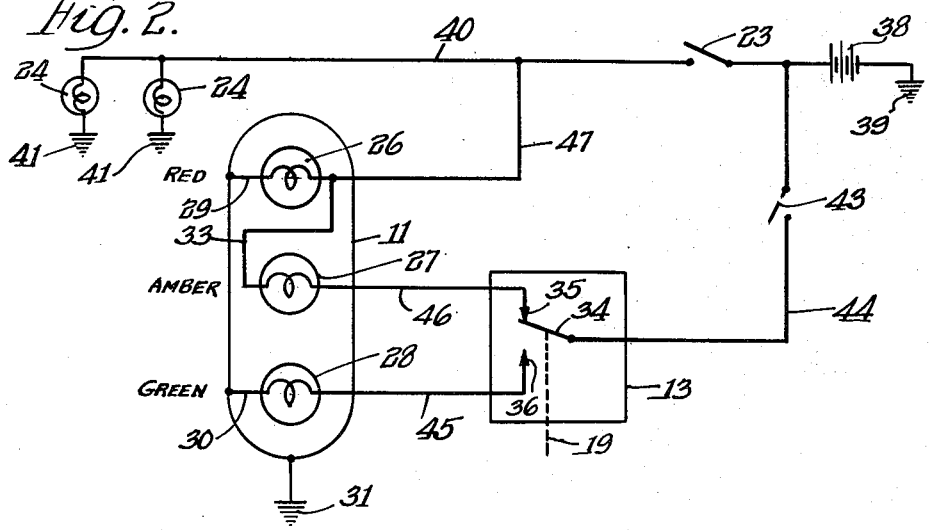
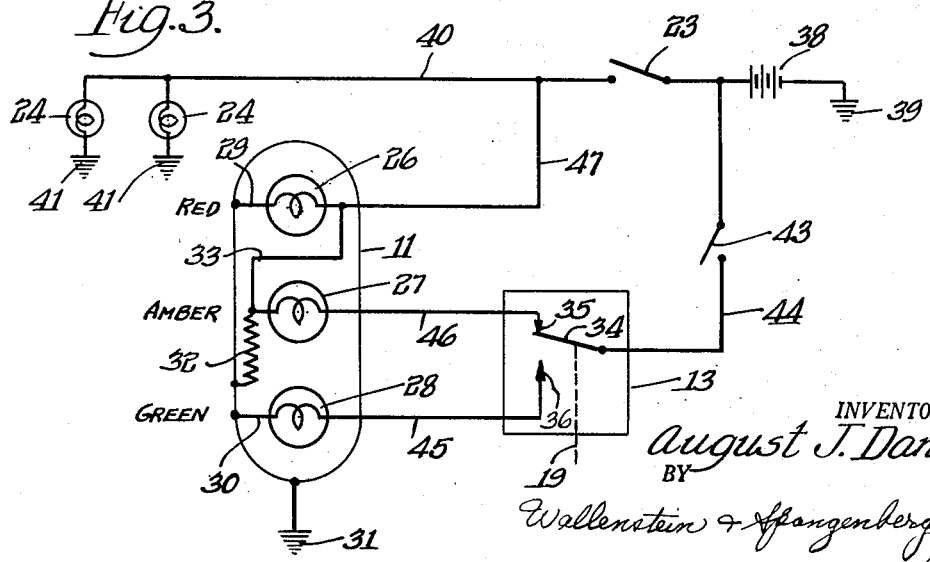
INVENTOR.
August J. Danek
BY
Wallenstein & Spangenberg
attys.

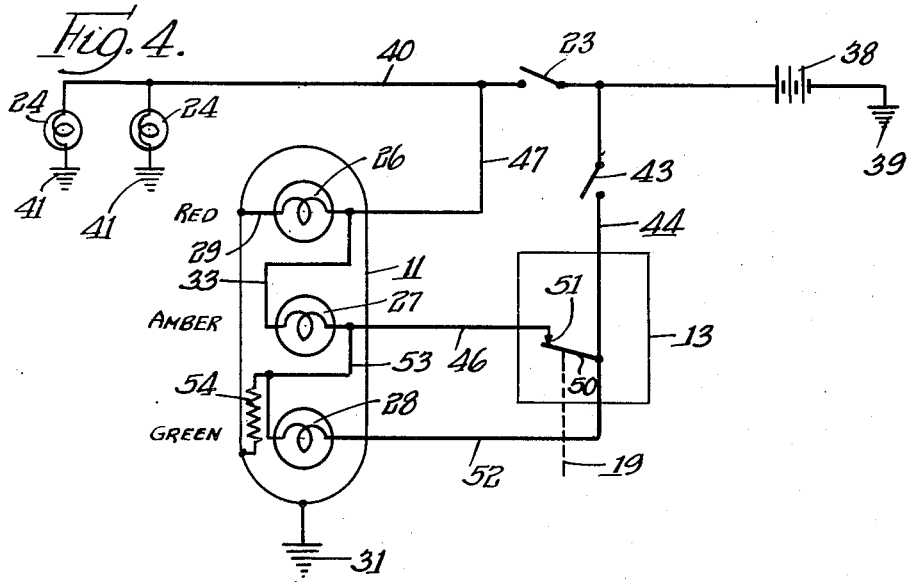
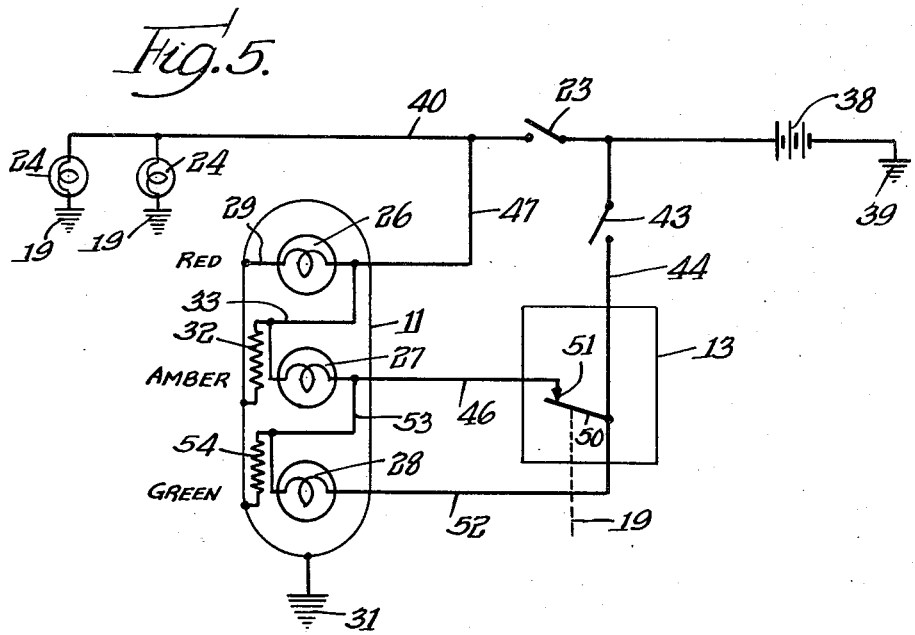

March 5, 1957 A. J. DANEK 2,784,348
SIGNAL LIGHT SYSTEM FOR MOTOR VEHICLES
Filed June 6, 1952 3 Sheets-Sheet 3

INVENTOR.
August J. Danek
BY
Wallenstein + Spangenberg
attys.

United States Patent Office 2,784,348
Patented Mar. 5, 1957

2,784,348

SIGNAL LIGHT SYSTEM FOR MOTOR VEHICLES

August J. Danek, Berwyn, Ill., assignor, by mesne assignments, to Auto Lamp Manufacturing Company, Chicago, Ill., a copartnership Application June 6, 1952, Serial No. 292,046

4 Claims. (Cl. 315—80)

This invention relates to signal light systems for a motor vehicle such as an automobile or the like for advising operating conditions to following vehicles. This application is a continuation in part of my copending application Serial No. 271,305, filed February 13, 1952. The signal light systems of this invention are improvements over those disclosed and claimed in Oscar W. Dorfman and Ernest Peters application Serial No. 245,-196, filed September 5, 1951, now U. S. Patent 2,740,105 and Charles B. Spangenberg application Serial No. 245,-119, filed September 5, 1951, now U. S. Patent 2,751,522.

The signal light systems of this invention, as well as the systems of the above-mentioned pending applications, include red, amber and green signal lights facing the rear of the motor vehicle which are controlled through switching means by the brake and accelerator mechanisms of the motor vehicle, the arrangement being such that the green signal light is illuminated to signal normal progress or safety when the accelerator is depressed, the amber signal light is illuminated to signal coasting, slow-down or caution when the accelerator is released, and the red signal light is illuminated to signal stopping or danger when the brakes are applied. In the aforementioned pending applications Serial Nos. 245,196 and 245,119, relays and plural switch means are utilized for the purpose of controlling the signal lights from the accelerator mechanism and the standard stop light switch. By reason of the instant invention the use of relays and plural switches is eliminated, thereby greatly reducing the manufacture and installation costs of the signal light system and also greatly simplifying the same.

The principal object of this invention is to provide an improved signal light system for a motor vehicle which is simple and rugged in construction and foolproof in operation, which may be operated directly from an accelerator operated switch means and a standard stop light switch without the inclusion of relays or the like, which may be inexpensively manufactured and which may be quickly and inexpensively installed as original equipment or as an accessory to a motor vehicle.

The signal light systems of this invention include two main components, a signal light housing having the red, amber and green signal lights and switching means for controlling the signal lights. The signal light housing is arranged at the rear of the motor vehicle with the signal lights thereof rearwardly exposed. The switching means includes a brake operated switch such as the standard stop light switch which is closed when the vehicle brakes are applied and also includes switching means operated by the accelerator mechanism of the motor vehicle. In some forms of this invention the accelerator operated switching means may be a single-pole, double-throw switch, while in other forms it may be a single-pole, single-throw switch. The accelerator operated switch means may be located at a place adjacent the accelerator mechanism to be operated thereby. Suitable electrical connections extend from the signal light housing to the brake operated switch and the accelerator operated switch means and to the voltage source of the vehicle.

The signal light systems of this invention are applied to a motor vehicle conventionally provided with a voltage source, a ground, stop lights, a brake operated switch, a stop light circuit between the voltage source and ground including the brake operated switch and stop lights for illuminating the stop lights when the brake operated switch is closed by application of the vehicle brakes, and an accelerator mechanism. The signal light system includes red, amber and green signal lights and switch means operated by the accelerator mechanism. A circuit including the red signal light extends between ground and a point in the stop light circuit between the stop lights and the brake operated switch thereof to connect the red signal light in parallel with the stop lights for illuminating the red signal light when the brake operated switch is closed for the purpose of illuminating the stop lights. The signal light system also has circuit means including the accelerator mechanism operated switch means and the amber and green signal lights for selectively illuminating the green and amber signal lights as the accelerator mechanism is depressed and released respectively. This circuit means includes a circuit extending from the voltage source through the switch means and one of the green or amber signal lights to the ungrounded side of the red signal light and also another circuit extending from the voltage source through the other of the green or amber signal lights and controlled by the switch means. The circuit means including the two last-mentioned circuits may take various forms depending upon the kind of accelerator operated switch utilized. These electrical circuits of the signal light system permit direct connection of the signal lights to the brake operated and accelerator operated switches for direct control thereby without the inclusion of relays or the like.

The signal light systems of this invention may take the form of an accessory to be applied to motor vehicles or it may be in the form of original equipment. In the latter event it may be desirable to incorporate the signal lights into the body of the motor vehicle and eliminate the separate housing for the signal lights.

Further objects of this invention reside in the details of construction of the signal light systems and in the cooperative relationships between the component parts thereof.

Other objects and advantages of this invention will become apparents to those skilled in the art upon reference to the accompanying specification, claims and drawings, in which:

Fig. 1 is an elevational view of an automobile having the signal light control systems of this invention applied thereto;

Fig. 2 is a wiring diagram illustrating one form of the signal light system of this invention;

Figs. 3, 4, 5, 6 and 7 are wiring diagrams illustrating other forms of the signal light systems of this invention.

Figure 6:
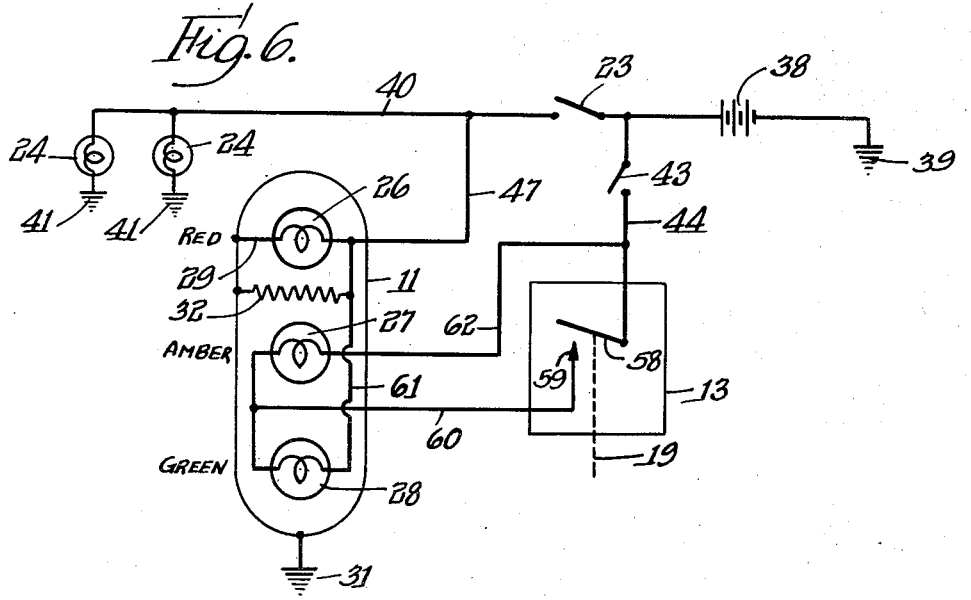

Referring first to Fig. 1, the signal light system of this invention is shown to be applied to a motor vehicle such as an automobile generally designated at 10. It includes a signal light housing 11 which is suspended in the automobile adjacent the rear window 12 thereof with the signal lights facing outwardly through the rear window. This signal light housing may take the form shown and described in the aforementioned Oscar W. Dorfman and Ernest Peters copending application. In the event of original equipment, the signal light housing 11 may be dispensed with and the signal lights suitably built into the rear of the automobile 10.

The signal light system of this invention also includes a switch means 13 which is suitably secured in place adjacent the accelerator mechanism as, for example, on the fire wall 14 under the hood 15 of the automobile. The accelerator mechanism includes linkage mechanism extending between the carburetor 17 and the accelerator pedal 18. The switch means 13 being located adjacent this accelerator linkage mechanism may be connected by a link 19 to any portion thereof, such as a bell crank lever 20. Thus, as the accelerator mechanism is depressed and released, the switch means 13 is operated. The signal lights in the signal light housing 11 may be connected by electrical connections 21 to the switch means 13 and by electrical connections 22 to the standard brake operated stop light switch 23 which controls the operation of the standard stop lights 24. The switch means 13 may also be connected by suitable electrical connections to the source of voltage of the motor vehicle.

Referring now to Fig. 2, the signal light housing 11 includes red, amber and green signal lights 26, 27 and 28, respectively. One side of the red signal light 26 is connected at 29 to the housing 11 which in turn is connected to ground as indicated at 31. Likewise, one side of the green signal light 28 is connected as at 30 to the housing 11 and hence to ground 31. One side of the amber signal light 27 is connected by a conductor 33 to the ungrounded side of the red signal light 26. In other words, the red and green signal lights 26 and 28 are directly connected to ground through the signal light housing 11 while the amber signal light 27 is electrically insulated from the housing 11 but is connected to the ungrounded side of the red signal light 26.

The switch means 13 which is operated by the accelerator mechanism in this form of the invention is a single-pole, double-throw switch having a common contact 34 and a pair of spaced switch contacts 35 and 36. Thus, the switch has two parts, one part including the common contact 34 and one of the contacts 35 and the other part including the common contact 34 and the other contact 36. The link 19 extending from the accelerator mechanism operates common contact 34 with respect to the spaced switch contacts 35 and 36, the arrangement being such that the common contact 34 engages the switch contact 35 when the accelerator is released as indicated in the drawing, or engages the other switch contact 36 when the accelerator is depressed. While the single-pole, double-throw switch 13 may be of the mechanical type as illustrated, it also may be of the mercury switch type as disclosed in the aforementioned copending Charles B. Spangenberg application.

The negative side of the voltage source 38 of the motor vehicle is connected to ground as indicated at 39 and the positive side thereof may be connected through standard brake operated stop light switch 23, conductor 40, and the standard stop lights 24 to ground as indicated at 41. Thus, when the vehicle brakes are applied, the brake operated switch 23 is closed to illuminate the standard stop lights 24.

The positive side of the voltage source 38 may also be connected through an ignition switch 43 and conductor 44 to the common contact 34 of the single-pole, double-throw switch 13. The switch contact 36 of the accelerator operated switch 13 is connected by a conductor 45 to the other or ungrounded side of the green signal light 28 and likewise the other switch contact 35 of the accelerator operated switch 13 is connected by a conductor 46 to the other side of the amber signal light 27. The ungrounded side of the red signal light 26 is connected by a conductor 47 to a point in the stop light circuit between the standard stop light switch 23 and the stop lights 24.

When the ignition switch 43 is closed and the accelerator mechanism is depressed, a circuit is completed from the voltage source 38 through the ignition switch 43, conductor 44, contacts 34 and 36, conductor 45, and the green signal light 28 to ground to illuminate the green signal light for indicating normal progress or safety. When the accelerator mechanism is released, the green light 28 is turned off and a circuit is completed from the voltage source 38 through ignition switch 43, conductor 44, contacts 34 and 35, conductor 46, amber signal light 27, and conductor 33 to the ungrounded side of the red signal light 26. From here the circuit takes three paths to ground, through the red signal light 26 and through the standard stop lights 24. The major portion of the voltage drop in this circuit occurs through the amber signal light 27 for illuminating the amber signal light to indicate coasting, slowdown or caution. Because the current takes a plurality of parallel paths to ground, the current flow through the red signal light 26 and the standard stop lights 24 to ground is so small as not to illuminate these lights. In other words, maximum voltage and current is applied under these conditions to the amber signal light 27 to illuminate the same and minimum voltage and current is applied to the red signal light 26 and the standard stop lights 24 so that they will not be illuminated. The parallel circuits between the amber signal light 27 and ground, including the red signal light 26 and the standard stop lights 24 carry only a small amount of current, a large portion of the current being consumed by the amber signal light 27. This characteristic operation is brought about by the differential in resistance of the amber signal light 27 when it is hot or illuminated as compared to when it is cold or extinguished.

When the vehicle brakes are applied to close the brake operated stop light switch 23, in addition to completing a circuit to the standard stop lights 24 another circuit is also completed from the voltage source 38 through the brake operated switch 23, conductor 47, and the red signal light 26 to ground. This circuit illuminates the red signal light 26 to indicate stopping or danger. This latter circuit is also connected through the conductor 33 to the amber signal light 27 so as to bring the voltage drop across the amber signal light 27 substantially to zero even though the common contact 34 is engaging the switch contact 35 of the accelerator operated switch. This latter circuit, therefore, effectively operates to prevent illumination of the amber signal light 27 when the vehicle brakes are applied for the purpose of illuminating the red signal light 26.

Thus, it is seen that the red, amber and green signal lights 26, 27 and 28 are directly controlled without the interposition of relays and plural contacts, by the accelerator operated switch means 13 and the standard brake operated switch 23 to perform the desired sequence of operation of the signal lights.

The signal light system illustrated in Fig. 3 is the same as that illustrated in Fig. 2 and like reference characters have been utilized for like parts. The operation of the signal light systems of Figs. 2 and 3 is also the same. In Fig. 3 a resistor 32 connects the ungrounded side of the red signal light 26 to ground to provide an additional path to ground in parallel with the red signal light 26. The purpose of the resistor 32 is to prevent illumination of the red signal light 26 upon illumination of the amber signal light 27 when the accelerator mechanism is released, even though one or both of the standard stop lights 24 should be burned out. By using the resistor 32 in Fig. 3, the operation of the signal light system is not dependent upon the presence of circuits through the standard stop lights 24. Thus, if the signal lights are in the form of original equipment wherein they are incorporated in the body of the vehicle, the standard stop lights 24 may be omitted and the system will still operate in the manner described above, this being made possible by the use of the resistor 32.

The signal light system of Fig. 4 is very much like that of Fig. 2 and like reference characters for like parts have been utilized. The two systems of Figs. 2 and 4 operate in the same way. The essential difference between the two systems is that in Fig. 4 a single-pole, single-throw switch is utilized rather than a single-pole, double-throw switch as in Fig. 2. Here the switch means 13 is shown to include a movable contact 50 operated by the link 19 into and out of engagement with a switch contact 51, the arrangement being such that the contacts 50 and 51 engage when the accelerator mechanism is released. The green signal light 28 is insulated from the signal light housing 11 and is connected in shunt with the single-pole, single-throw switch by conductors 52 and 53. A point in the connection 53 between the green signal light 28 and the amber signal light 27 is connected through a resistor 54 to ground 31.

In Fig. 4 when the accelerator mechanism is released, the single-pole, single-throw switch is closed to illuminate the amber signal light 27 in the manner described above in connection with Fig. 2. At this time the single-pole, single-throw switch also shunts the green signal light 28 so that it is not illuminated. When, however, the accelerator mechanism is depressed, the accelerator operated switch is opened to break the shunt circuit, whereupon a circuit is established from the voltage source 38 through switch 43, conductors 44 and 52, green signal light 28 and resistor 54 to ground 31 for illuminating the green signal light 28. Under these conditions the amber signal light 27 is not illuminated for the current flow therethrough is extremely small, due to the presence of the resistor 54. When the vehicle brakes are applied, the red signal light 26 is illuminated in the manner described above in connection with Fig. 2. Thus, the arrangement of Fig. 4 operates in substantially the same manner as the arrangement of Fig. 2 but utilizes a resistor and a single-pole, single-throw switch in lieu of a single-pole, double-throw switch as in Fig. 2.

The signal light system of Fig. 5 is like that of Fig. 4, operates in the same manner as that of Fig. 4, and like reference characters have been utilized for like parts. In addition, Fig. 5 includes the resistor 32 connected between the ungrounded side of the red signal light 26 and ground 31 so that the operation of the signal light system is not dependent upon the presence of the standard stop lights 24, all as pointed out above in connection with Fig. 3. Essentially, the signal light system of Fig. 5 differs from that of Fig. 4 in the same manner that the signal light system of Fig. 3 differs from that of Fig. 2. As a result the signal light system of Fig. 5 may be incorporated as original equipment in the body of the vehicle and the standard stop lights 24 may be omitted, if desired.

Figure 7:
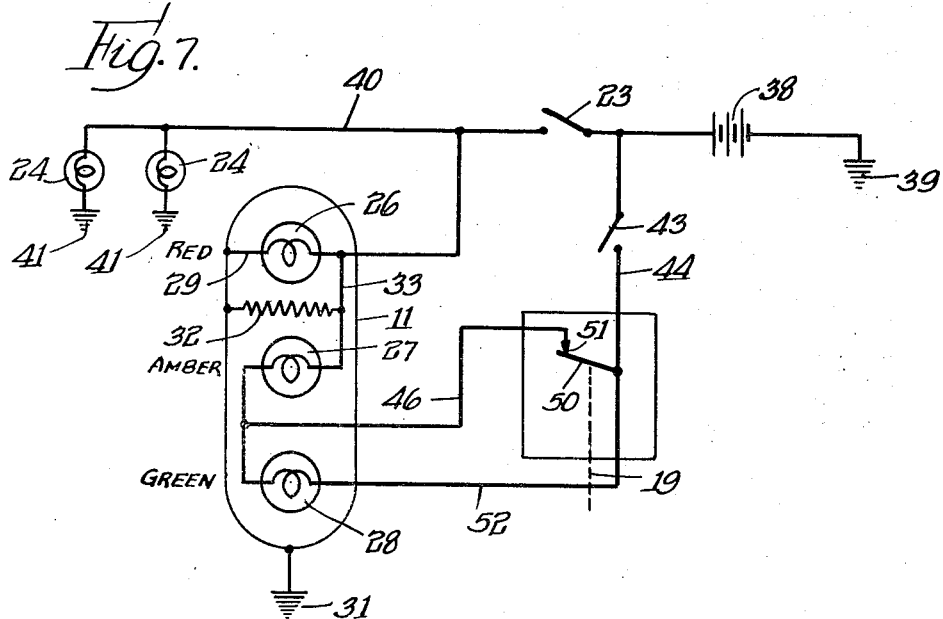

The signal light system of Fig. 7 is like those illustrated in Figs. 4 and 5 and it operates in substantially the same manner. Like reference characters have been utilized for like parts. The signal light system of Fig. 7 also utilizes a single-pole, single-throw switch operated by the accelerator mechanism wherein the switch is also closed when the accelerator is released for the purpose of illuminating the amber signal light. This accelerator operated switch is also connected in shunt with the green signal light 28. Instead of utilizing the resistor 54 as in Figs. 4 and 5, the green signal light 28 of the signal light system of Fig. 7 has a higher resistance than that of the amber signal light 27. Thus, when the single-pole, single-throw switch is opened upon depressing the accelerator mechanism, a circuit is completed from the voltage source 38 through switch 43, conductors 44 and 52, the green signal light 28, the amber signal light 27 and conductor 33 to the ungrounded side of the red signal light 26. Because the resistance of the green signal light 28 is greater than that of the amber signal light 27, the green signal light will be illuminated while the amber light will not. When the accelerator mechanism is released, the green signal light is shunted and the amber signal light 27 is illuminated. When the vehicle brakes are applied, the red signal light 26 is illuminated in the manner discussed above. Here, also, the ungrounded side of the red signal light 26 may be connected through resistor 32 to ground so as to make the signal light system independent of the presence of the standard stop lights 24 as is the case in the signal light systems of Figs. 3 and 5.

The signal light system of Fig. 6 is like that of Fig. 7, except that in the system of Fig. 6 the single-pole, single-throw switch operated by the accelerator mechanism is normally open and is closed when the accelerator mechanism is depressed and the amber signal light 27 is of higher resistance than that of the green signal light 28. Here the single-pole, single-throw switch 13 includes a contact 58 operated by the link 19 for engaging a switch contact 59 when the accelerator mechanism is depressed. The switch contact 59 is connected through conductor 60 to one side of the green signal light and the other side thereof is connected through a conductor 61 to the ungrounded side of the red signal light 26. The amber signal light 27 of higher resistance is connected in shunt with the single-pole, double-throw switch by a conductor 62.

When the accelerator mechanism is released, a circuit is completed from the voltage source 38 through switch 43, conductors 44 and 62, amber signal light 27, green signal light 28, conductor 61 to the ungrounded side of the red signal light 26. Because the amber signal light 27 is of higher resistance than the green signal light 28, the amber signal light will be illuminated while the green signal light will not. When the accelerator mechanism is depressed, the single-pole, single-throw switch is closed to shunt the amber signal light, whereupon the green signal light is illuminated. When the vehicle brakes are applied, the red signal light 26 is illuminated in the manner discussed above. Here as in Fig. 7, the ungrounded side of the red signal light 26 may be connected to ground through the resistor 32 so as to make the signal light system independent of the presence of the standard stop lights 24 as discussed above in connection with Figs. 3, 5 and 7.

While for purpose of illustration several forms of this invention have been disclosed, other forms thereof may become apparent to those skilled in the art upon reference to this disclosure and, therefore, this invention is to be limited only by the scope of the appended claims.

I claim as my invention:

1. A signal light system for use with a motor vehicle having a voltage source, a ground, an accelerator, a stop light, a single-pole single-throw brake operated switch, and an electrical circuit between the voltage source and ground including said brake operated switch and stop light for illuminating the stop light when the brake operated switch is closed; said signal light system comprising a single-pole single-throw switch means operatively associated with said accelerator for movement to open and closed conditions, one of said switch means conditions being obtained when the vehicle's accelerator is depressed and the other condition being obtained when the accelerator is released, said switch means being normally in one of said conditions, and an indicating mechanism including first, second and third lights, a portion of a first electrical circuit running from the voltage source through and beyond the first signal light, a portion of a second electrical circuit running from the voltage source through and beyond the second signal light, said switch means being interposed in one of said circuits between said voltage source and one of said two signal lights, a third electrical circuit from the voltage source through said brake operated switch and through said third signal light to ground, an electrical conductor connecting a point in said third circuit, between said third signal light and said brake operated switch, with a point in said second circuit on the side of said second signal light opposite to said voltage source, a second electrical conductor connecting a point in said second circuit, between said second signal light and said voltage source, with a point in said first circuit on the side of said first signal light opposite to said voltage source, thereby providing a plurality of parallel electrically conductive paths from both said first and second signal lights to ground, one of said plurality of parallel paths from both said first and second signal lights passing through said third signal light, said first electrical conductor being operative when said brake operated switch is closed to apply source voltage to the side of said second signal light opposite to the side through which source voltage is applied through said second circuit, and said second electrical conductor being operative when said switch means is closed to apply source voltage to the side of said first signal light opposite to the side through which source voltage is applied through said first circuit portion.

2. A signal light system for use with a motor vehicle having a voltage source, a ground, an accelerator, a stop light, a single-pole single-throw brake operated switch, and an electrical circuit between the voltage source and ground including said brake operated switch, and an electrical circuit between the voltage source and ground including said brake operated switch and stop light for illuminating the stop light when the brake operated switch is closed; said signal light system comprising a single-pole single-throw switch means operatively associated with said accelerator for movement to open and closed conditions, one of said switch means conditions being obtained when the vehicle's accelerator is depressed and the other condition being obtained when the accelerator is released, said switch means being normally in one of said conditions, and an indicating mechanism including first, second and third lights, a portion of a first electrical circuit running from the voltage source through and beyond the first signal light, a portion of a second electrical circuit running from the voltage source through and beyond the second signal light, said switch means being interposed in one of said circuits between said voltage source and one of said two signal lights, a third electrical circuit from the voltage source through said brake operated switch and through said third signal light to ground, an electrical conductor connecting a point in said third circuit, between said third signal light and said brake operated switch, with a point in said second circuit on the side of said second signal light opposite to said voltage source, a second electrical conductor connecting a point in said second circuit, between said second signal light and said voltage source, with a point in said first circuit on the side of said first signal light opposite to said voltage source, thereby providing a plurality of parallel electrically conductive paths from both said first and second signal lights to ground, one of said plurality of parallel paths from both said first and second signal lights passing through said third signal light, and said first electrical conductor being operative when said brake operated switch is closed to apply source voltage to the side of said second signal light opposite to the side through which source voltage is applied through said second circuit, said second electrical conductor being operative when said switch means is closed to apply source voltage to the side of said first signal light opposite to the side through which source voltage is applied through said first circuit portion, said first circuit including a resistor between said first signal light and ground, and said second circuit including a resistor between said second signal light and ground.

3. A signal light system for use with a motor vehicle having a voltage source, a ground, an accelerator, a stop light, a single-pole single-throw brake operated switch, and an electrical circuit between the voltage source and ground including said brake operated switch and stop light for illuminating the stop light when the brake operated switch is closed; said signal light system comprising a single-pole single-throw switch means operatively associated with said accelerator for movement to an open position when the vehicle's accelerator is in one position and to a closed position when the accelerator is in another position, said switch means being normally positioned in one of said positions, and an indicating mechanism including first, second and third lights, a first electrical circuit between the voltage source and ground through said first and second signal lights in series, the first signal light being of greater resistance than the second signal light, whereby when the voltage is applied across said first circuit only the first signal light is illuminated, a second electrical circuit running from the voltage source to ground through the switch means, when in the closed position, and through said second signal light, a third electrical circuit from the voltage source through said brake operated switch and through said third signal light to ground, a first electrical conductor connecting a point in said third circuit, between said third signal light and said brake operated switch, with a point in said second circuit on the side of said second signal light opposite to said voltage source, a second electrical conductor connecting a point in said second circuit, between said switch means and said second signal light, to the side of said first signal light opposite said voltage source, thereby providing a plurality of parallel electrically conductive paths from both said first and second signal lights to ground, one of said plurality of parallel paths from both said first and second signal lights passing through said third signal light, said first electrical conductor being operative when said brake operated switch is closed to apply source voltage to opposite sides of said second signal light, thereby operating to extinguish said second signal light without resorting to breaking of said second circuit.

4. A signal light system for use with a motor vehicle having a voltage source, a ground, an accelerator, a stop light, a single-pole single-throw brake operated switch, and an electrical circuit between the voltage source and ground including said brake operated switch and stop light for illuminating the stop light when the brake operated switch is closed; said signal light system comprising a single-pole single-throw switch means operatively associated with said accelerator for movement to an open position when the vehicle's accelerator is in one position and to a closed position when the accelerator is in another position, said switch means being normally positioned in one of said positions, and an indicating mechanism including first, second and third lights, a first electrical circuit between the voltage source and ground through said first and second signal lights in series, the first signal light being of greater resistance than the second signal light, whereby when the voltage is applied across said first circuit only the first signal light is illuminated, a second electrical circuit running from the voltage source to ground through the switch means, when in the closed position, and through said second signal light, a third electrical circuit from the voltage source through said brake operated switch and through said third signal light to ground, a first electrical conductor connecting a point in said third circuit, between said third signal light and said brake operated switch, with a point in said second circuit on the side of said second signal light opposite to said voltage source, a second electrical conductor connecting a point in said second circuit, between said switch means and said second signal light, to the side of said first signal light opposite said voltage source, thereby providing a plurality of parallel electrically conductive paths from both said first and second signal lights to ground, one of said plurality of parallel paths from both said first and second signal lights passing through said third signal light, said first electrical conductor being operative when said brake operated switch is closed to apply source voltage to opposite sides of said second signal light, thereby operating to extinguish said second signal light without resorting to breaking of said second circuit, and a resistor in said second circuit between said second signal light and ground.

(References on following page)

References Cited in the file of this patent

UNITED STATES PATENTS

| | | |
|---|---|---|
| 1,909,712 | Oppegaard | May 16, 1932 |
| 2,096,069 | Seiden | Oct. 19, 1937 |
| 2,128,769 | Finnell | Aug. 30, 1938 |
| 2,260,680 | Nelsen | Oct. 28, 1941 |
| 2,956,056 | Bellec et al. | Apr. 24, 1944 |
| 2,362,021 | Nazar | Nov. 7, 1944 |
| 2,463,088 | Coombs | Mar. 1, 1949 |
| 2,275,695 | Stafford | Mar. 10, 1949 |